United States Patent
Hardee et al.

(10) Patent No.: US 10,469,429 B2
(45) Date of Patent: Nov. 5, 2019

(54) CONTEXT-BASED MESSAGE NOTIFICATION

(71) Applicant: INTERNATIONAL BUSINESS MACHINES CORPORATION, Armonk, NY (US)

(72) Inventors: Christopher J. Hardee, Raleigh, NC (US); Karan Goenka, Cary, NC (US); Lorie A. Goins, Raleigh, NC (US); James P. Ward, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 15/444,833

(22) Filed: Feb. 28, 2017

(65) Prior Publication Data

US 2018/0248829 A1 Aug. 30, 2018

(51) Int. Cl.
*G06F 15/16* (2006.01)
*H04L 12/58* (2006.01)

(52) U.S. Cl.
CPC .............. *H04L 51/24* (2013.01); *H04L 51/14* (2013.01)

(58) Field of Classification Search
CPC ................................ H04L 51/24; H04L 51/38
USPC ........................................ 709/206, 204, 207
See application file for complete search history.

(56) References Cited

U.S. PATENT DOCUMENTS

| | | | |
|---|---|---|---|
| 7,975,015 B2 | 7/2011 | Horvitz et al. | |
| 8,452,266 B2* | 5/2013 | Chiu | G06Q 10/109 455/412.2 |
| 2002/0087649 A1 | 7/2002 | Horvitz | |
| 2005/0204001 A1* | 9/2005 | Stein | G06Q 10/107 709/206 |
| 2008/0107045 A1* | 5/2008 | Berstis | H04L 12/66 370/263 |
| 2012/0136942 A1* | 5/2012 | Amidon | H04M 3/42374 709/206 |
| 2014/0208336 A1 | 7/2014 | Shia et al. | |
| 2015/0266377 A1* | 9/2015 | Hampiholi | B60K 35/00 455/466 |

(Continued)

FOREIGN PATENT DOCUMENTS

WO 2016093870 A1 6/2016

*Primary Examiner* — Liang Che A Wang
*Assistant Examiner* — Kaylee J Huang
(74) *Attorney, Agent, or Firm* — Cantor Colburn LLP; David Zwick

(57) ABSTRACT

Systems, methods, and computer-readable media for performing context-based delayed notification of messages are disclosed. Context-based delayed notification of messages can include delaying notification of incoming messages received or generated by a user device to a user of the device until a determination is made that the messages satisfy message delivery criteria. Contextual data such as location data, time data, device usage data, or the like can be used to determine whether the message delivery criteria are satisfied. Messages received by a user device from one or more senders can be categorized into one or more message categories based on message categorization criteria. Individual messages or groups of messages within a message category can be evaluated against the message delivery criteria using the contextual data to determine whether notification of the messages to a user should be delayed or allowed to proceed.

20 Claims, 6 Drawing Sheets

(56) References Cited

U.S. PATENT DOCUMENTS

2016/0191437 A1* 6/2016 Thomas ............... H04W 4/12
                                                  709/206
2017/0083680 A1* 3/2017 Adolphus ........... G06F 19/3431

* cited by examiner

CONTEXT-BASED MESSAGE NOTIFICATION

BACKGROUND

The present invention relates to message notifications, and more specifically, to delayed context-based message notification.

In mobile computing, mobile users can receive a large number of notifications in a short period of time. Such notifications can range from notifications received from mobile applications; short message service (SMS), email, or other text-based notifications; notifications relating to voice calls; or the like. Conventional devices/systems typically deliver a notification to a user or otherwise make a user aware of a received message at or near the time of receipt through the use of audible, visual, and/or haptic output. However, receipt of a large number of notifications in a short period of time and the corresponding device output associated therewith can be disruptive to the user experience. As such, some devices/systems allow a user to customize the type of output they receive including the capability to cease all output indicative of notifications unless the device is being actively used. However, such conventional devices/systems suffer from a number of drawbacks, technical solutions to which are described herein.

SUMMARY

In one or more example embodiments of the disclosure, a method for delaying message notification is disclosed. The method includes receiving, by a user device, messages from one or more senders and categorizing the messages into one or more message categories based at least in part on message categorization criteria. The method further includes identifying contextual data and message delivery criteria that is relevant to the categorized messages, and determining, based at least in part on the contextual data, that at least one message satisfies the message delivery criteria for delivery to a user of the user device. The method additionally includes generating one or more notifications indicative of receipt of the at least one message, and presenting, via the user device, the one or more notifications to the user.

In one or more other example embodiments of the disclosure, a system for delaying message notification is disclosed. The system includes at least one memory storing computer-executable instructions and at least one processor configured to access the at least one memory and execute the computer-executable instructions to perform a set of operations. The operations include identifying messages received by a user device from one or more senders and categorizing the messages into one or more message categories based at least in part on message categorization criteria. The operations further include identifying contextual data and message delivery criteria that is relevant to the categorized messages, and determining, based at least in part on the contextual data, that at least one message satisfies the message delivery criteria for delivery to a user of the user device. The operations additionally include generating one or more notifications indicative of receipt of the at least one message, and presenting, via the user device, the one or more notifications to the user.

In one or more other example embodiments of the disclosure, a computer program product for delaying message notification is disclosed. The computer program product includes a non-transitory storage medium readable by a processing circuit, the storage medium storing instructions executable by the processing circuit to cause a method to be performed. The method includes receiving, by a user device, messages from one or more senders and categorizing the messages into one or more message categories based at least in part on message categorization criteria. The method further includes identifying contextual data and message delivery criteria that is relevant to the categorized messages, and determining, based at least in part on the contextual data, that at least one message satisfies the message delivery criteria for delivery to a user of the user device. The method additionally includes generating one or more notifications indicative of receipt of the at least one message, and presenting, via the user device, the one or more notifications to the user.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals can be used to identify similar components as well. Various embodiments may or may not utilize elements or components other than those illustrated in the drawings, and some elements and/or components may or may not be present in various embodiments. The use of singular terminology to describe a component or element can, depending on the context, encompass a plural number of such components or elements and vice versa.

DETAILED DESCRIPTION

Overview

Figure 1:
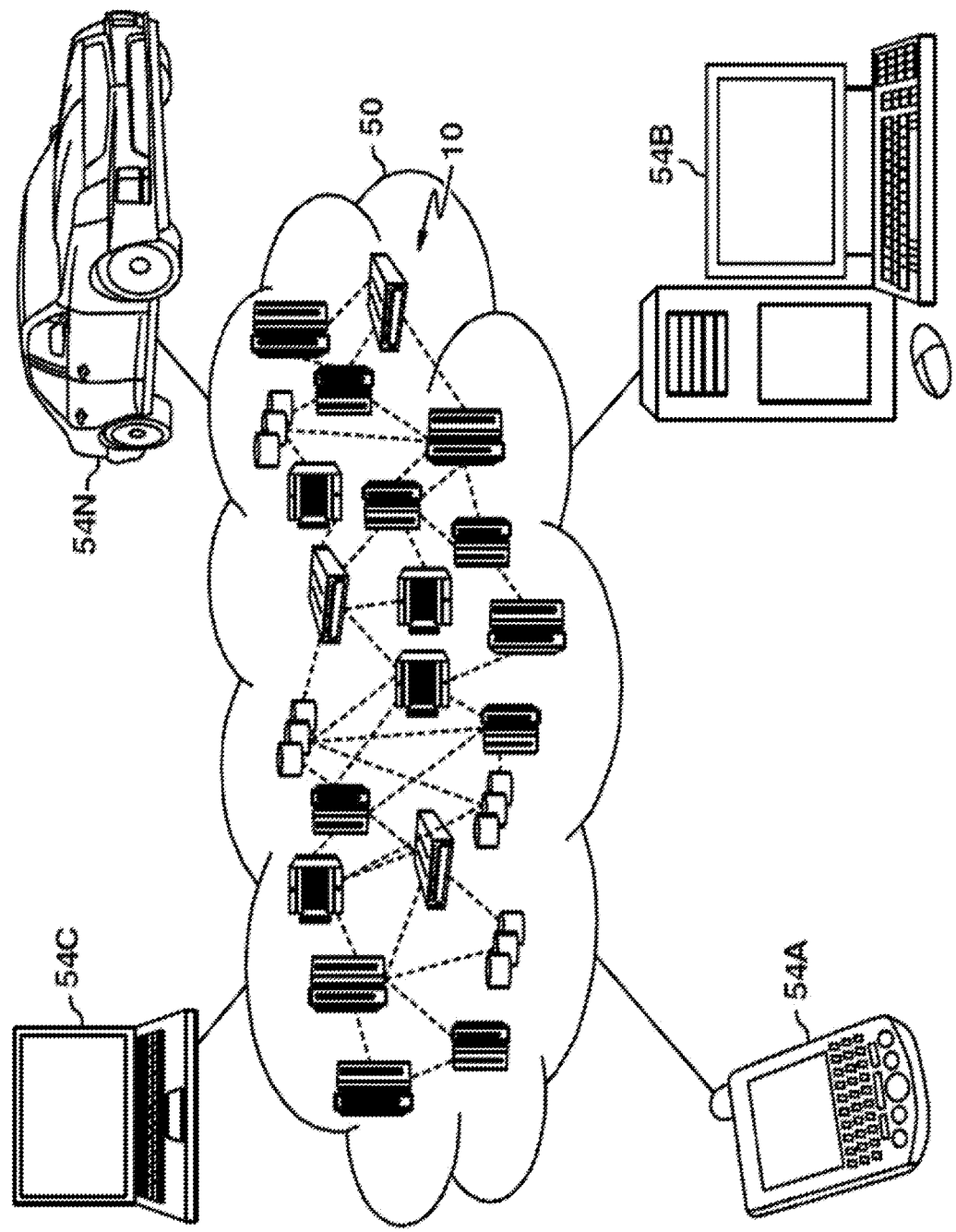
FIG. 1 depicts a cloud computing environment in accordance with one or more example embodiments of the disclosure.

Example embodiments of the disclosure include, among other things, systems, methods, computer-readable media, techniques, and methodologies for performing context-based delayed notification of messages according to which notification of incoming messages received or generated by a user device to a user of the device can be delayed until a determination is made that the messages satisfy message delivery criteria. Contextual data such as location data, time data, device usage data, or the like can be used to determine whether the message delivery criteria are satisfied.

More specifically, in accordance with example embodiments of the disclosure, messages received by a user device from one or more senders can be categorized into one or more message categories based on message categorization criteria. The message categorization criteria, which will be described in greater detail later in this disclosure, can include user-specified criteria and/or default criteria selected by the device and can include or relate to, without limitation, the sender of a message; the time of receipt of the message; the location of the user device when the message is received; whether one or more keywords are present in the message; and so forth. In certain example embodiments, message categorization may or may not be performed.

The categorized messages in each message category can then be evaluated as a group or individually (depending on whether message categorization is performed) against message delivery criteria to determine whether one or more messages should be delivered to a user of a user device. Delivery of a message to a user can include generating audible, visual, and/or haptic output at the user device that serves as a notification that a message has been received, and that optionally provides an identification of the urgency of the message, the type of message, and/or the sender of the message. The message delivery criteria, which will be described in greater detail later in this disclosure, can include or relate to, without limitation, a threshold number of messages being received within a predetermined period of time; a threshold amount of time having passed since receipt of a message from a particular sender; a threshold level of importance/urgency of a message or an aggregate level of importance/urgency of all or some messages within a message category; characteristics of a sender of a message; location criteria; time criteria; and so forth.

Contextual data can be analyzed to determine whether a message or a categorized group of messages satisfies message delivery criteria. For example, for certain senders who exhibit a tendency to send numerous messages of low importance/urgency within a short period of time, the message delivery criteria can specify that a user is to be notified of messages from such a sender only after a threshold number of messages have been received from the sender within a predetermined period of time; a threshold amount of time has passed since receipt of a message from a particular sender; or messages received from the sender have reached a threshold level of individual or aggregate importance/urgency. As another non-limiting example, the message delivery criteria can specify that notification of messages from a particular sender or group of senders should be delayed if received outside of a predetermined period of time during a day or on a particular day and should only be delivered during the predetermined period of time during the day or on designated days. As yet another non-limiting example, the message delivery criteria can specify that delivery of messages from a particular sender or group of senders should be delayed until the user device is within a prescribed location or outside of a proscribed location. The contextual data relevant to these example message delivery criteria can include timestamps indicating when messages are received, location data indicating locations of a user device when messages are received, message counts, or the like.

It should be appreciated that the above examples of categorization criteria, message delivery criteria, and contextual data are merely illustrative and not exhaustive. Further example types of categorization criteria, message delivery criteria, and contextual data will be described later in this disclosure. It should further be appreciated that users can be provided with a capability to customize message delivery criteria for a particular sender or a group of senders who share certain attributes. Alternatively, user-specified or default message delivery criteria can be uniformly applied to all users, potentially based on an analysis of contextual data. In addition, in certain example embodiments, the user device or a remote server communicatively coupled to the user device can generate message delivery criteria or customize user-specified or default criteria based on an analysis of historical messaging behavior of a sender or a group of senders. This will be described in greater detail later in this disclosure.

In certain example embodiments, a respective metric can be applied to each incoming message. The metric can be an importance score or the like that represents a measure of a level of importance or urgency of the message. The metric can be determined based on any number of relevant factors including, without limitation, whether predetermined keywords indicative of importance or urgency are present in the message; a priority assigned to a sender of the message; a time of day during which the message is received; a frequency with which messages are historically received from the sender; and so forth. The various factors that are evaluated can be assigned respective weights, which can be predetermined or can dynamically change based on message delivery criteria and/or changes in contextual data.

In certain example embodiments, an aggregate importance/urgency metric can be determined for a group of messages (e.g., all or some messages within a same message category) based on the respective metric associated with each individual message. The group of messages can be from a same sender or from a group of senders who share common attributes. Alternatively, the group of messages can simply be some or all messages categorized within a same message category based on message content or other criteria unrelated to the senders of the messages. The aggregate metric can be compared against a threshold value. Additionally, or alternatively, one of more importance/urgency metrics associated with individual messages can be compared against corresponding threshold values. A threshold value can be user-specified or a default value. In addition, a threshold value associated with a particular sender, a particular group of senders, a particular message, or a particular message category can dynamically change based on changes in sender messaging behavior and/or changes in contextual data. In certain example embodiments, a message or grouping of messages is delivered only if one or more corresponding importance/urgency metrics satisfy corresponding threshold value(s). A first value can be deemed to satisfy a second value, if the first value is greater than or equal to the second value or if the first value is less than or equal to the second value, depending on the implementation.

Example embodiments of the disclosure address a number of drawbacks associated with existing technologies that allow a user to customize the type of message notification output generated by a user device and the criteria based upon which the notification output is generated. For instance, existing technologies merely permit a user to specify different types of notification output for senders having different priority levels. For example, existing technologies allow a user to set a user device to a "priority mode" in which voice calls only generate a ringtone if received from a prioritized user or text-based messages only generate an audible tone if received from a prioritized user. Existing technologies also permit a user to set a user device to a "silent" mode in which no audible or haptic notification output is generated for any message or a "vibrate mode" in which only haptic output is generated. None of these existing technologies, however, permit delayed notification of messages based on an evaluation of message delivery criteria with respect to contextual data and message/sender characteristics or attributes. Further, while some existing technologies permit aggregation of similar messages, none of these existing technologies enable message categorization based on customizable and varied message categorization criteria and the application of different message delivery criteria for different message categories, senders, or groups of senders. Example embodiments of the disclosure provide these enhanced capabilities, and thus, provide a much more customizable and tailored approach to controlling message notification output by the user device than existing technologies.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
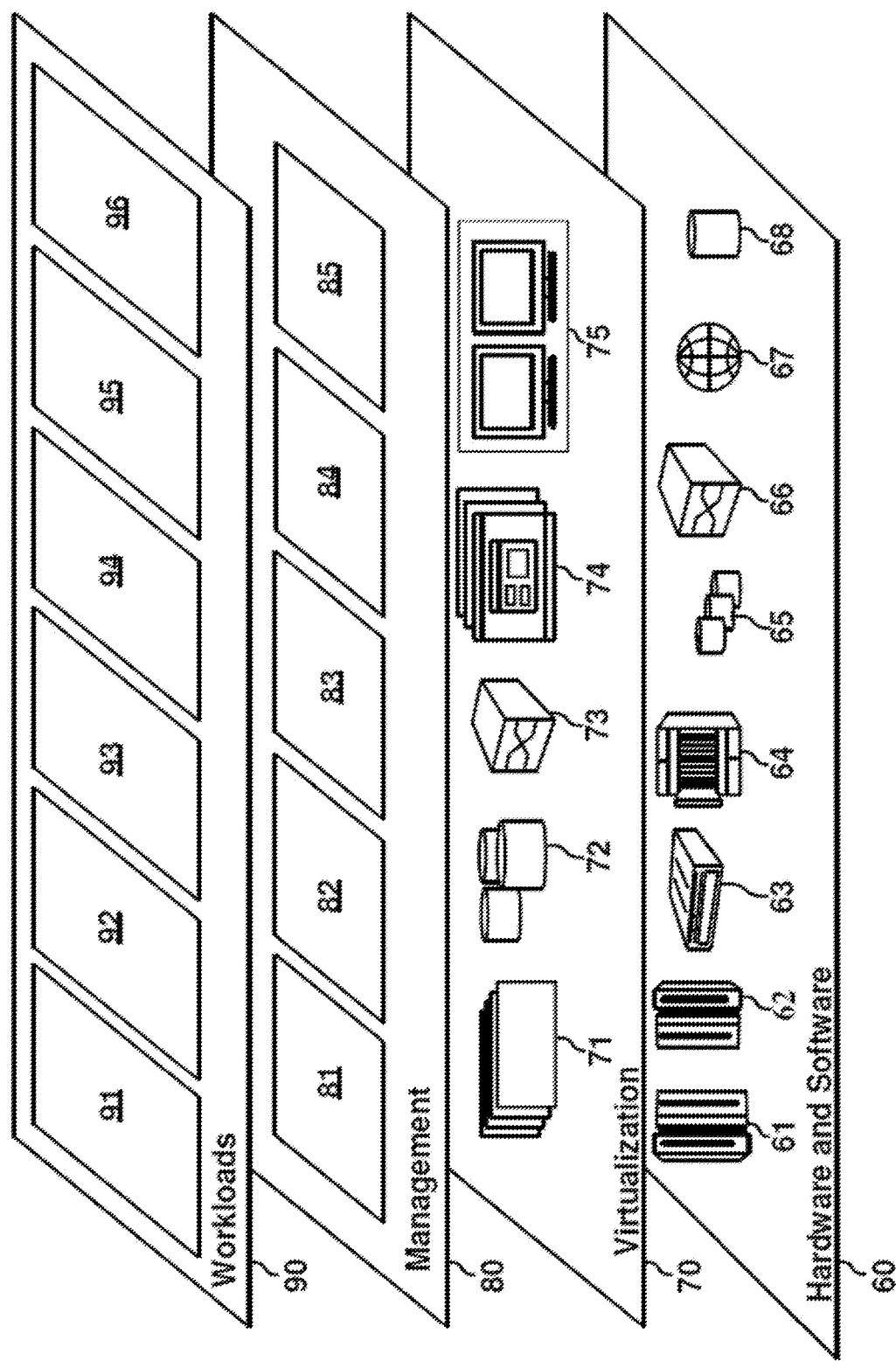
FIG. 2 depicts abstraction model layers in accordance with one or more example embodiments of the disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and photograph sharing 96.

Example Embodiments

Figure 3:
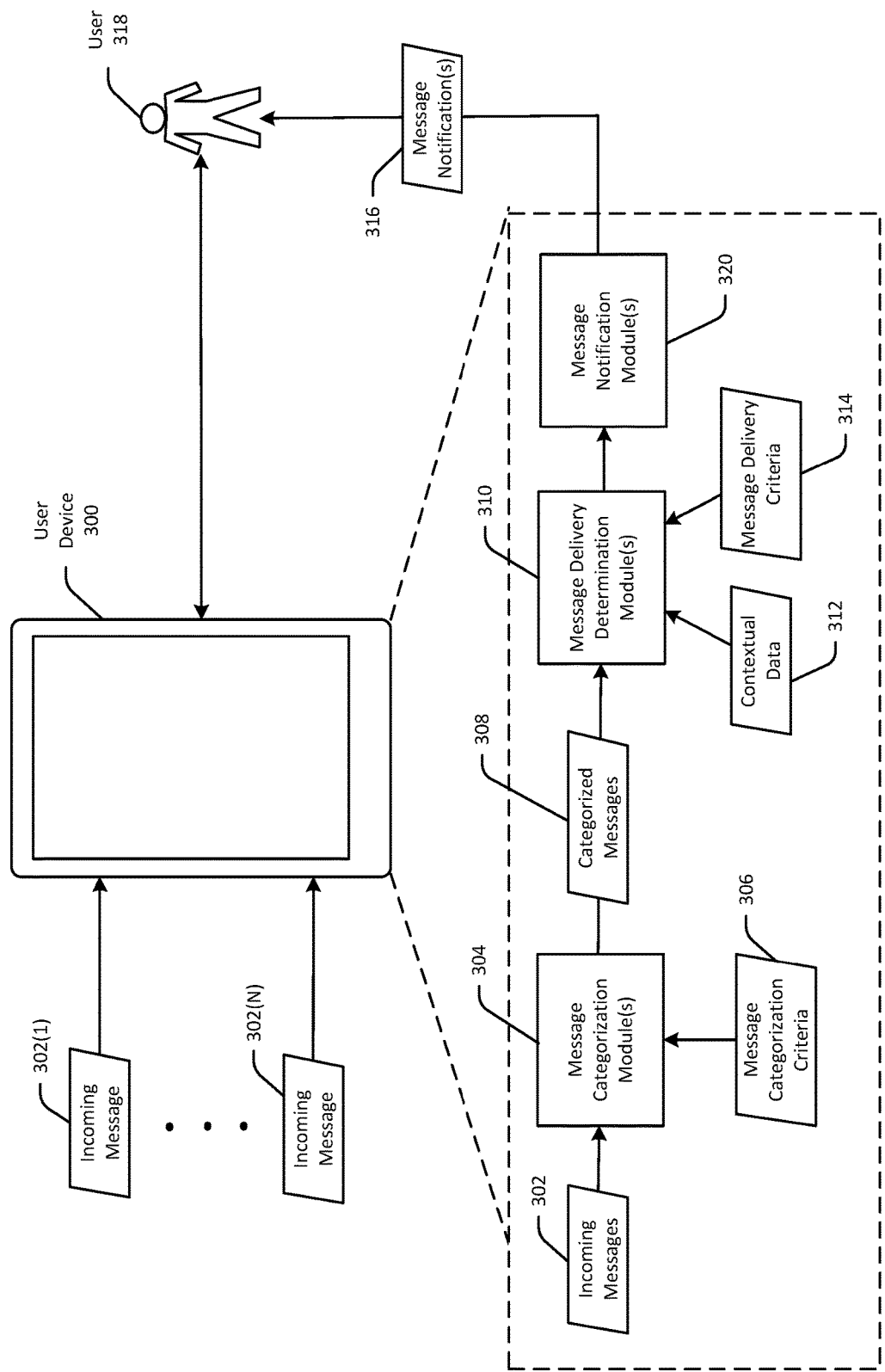
FIG. 3 is a block diagram schematically depicting delayed context-based message notification in accordance with one or more example embodiments of the disclosure.
Figure 4:
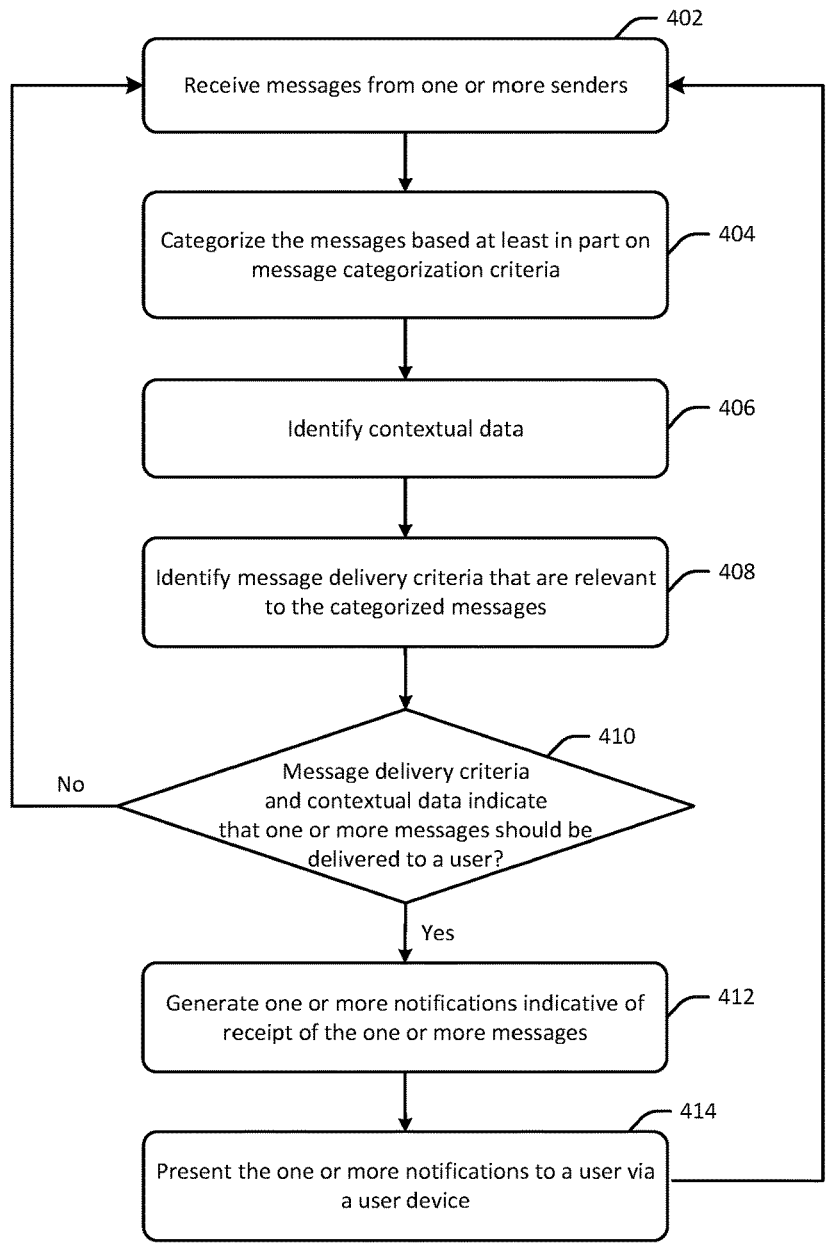
FIG. 4 is a process flow diagram of an illustrative method for performing delayed context-based message notification in accordance with one or more example embodiments of the disclosure.
Figure 5:
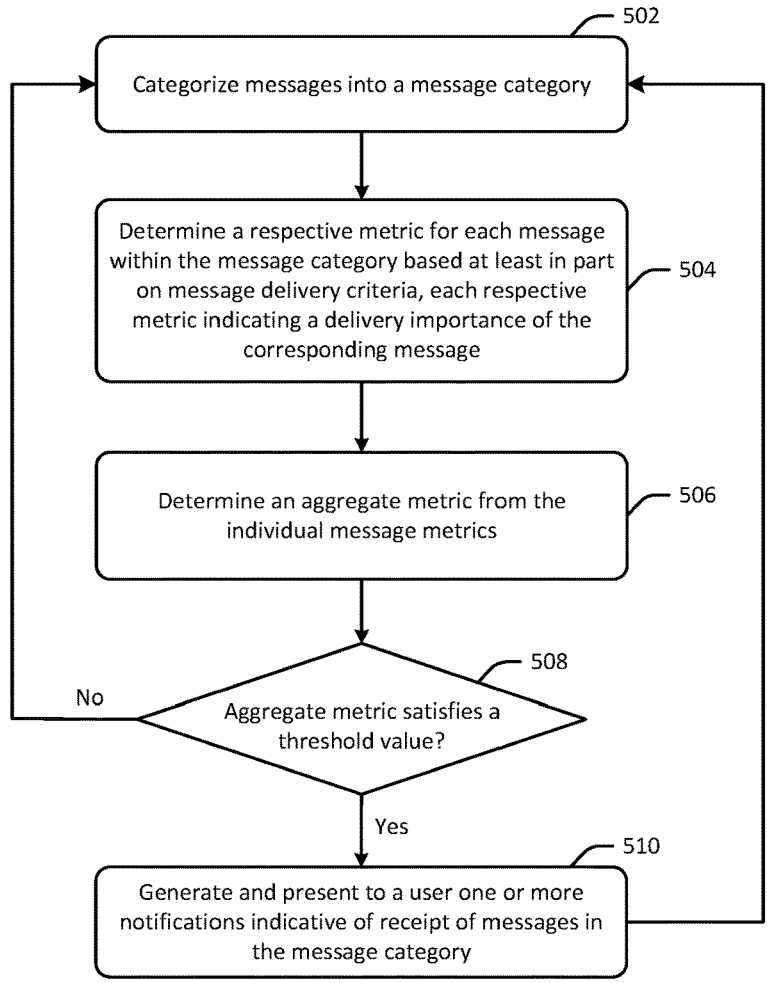
FIG. 5 is a process flow diagram of an illustrative method for utilizing metrics indicative of an importance of received messages to determine if the messages satisfy message delivery criteria in accordance with one or more example embodiments of the disclosure.

FIG. 3 is a block diagram schematically depicting delayed context-based message notification in accordance with one or more example embodiments of the disclosure. FIG. 4 is a process flow diagram of an illustrative method 400 for performing delayed context-based message notification in accordance with one or more example embodiments of the disclosure. FIG. 5 is a process flow diagram of an illustrative method 500 for utilizing metrics indicative of an importance of received messages to determine if the messages satisfy message delivery criteria in accordance with one or more example embodiments of the disclosure. Each of FIGS. 4 and 5 will be described in conjunction with FIG. 3 hereinafter.

Each operation of the method 400 and/or the method 500 can be performed by one or more of the program modules depicted in FIG. 3 or FIG. 6, whose operation will be described in more detail hereinafter. These program modules can be implemented in any combination of hardware, software, and/or firmware. In certain example embodiments, one or more of these program modules can be implemented, at least in part, as software and/or firmware modules that include computer-executable instructions that when executed by a processing circuit cause one or more operations to be performed. A system or device described herein as being configured to implement example embodiments of the disclosure can include one or more processing circuits, each of which can include one or more processing units or nodes. Computer-executable instructions can include computer-executable program code that when executed by a processing unit can cause input data contained in or referenced by the computer-executable program code to be accessed and processed to yield output data.

Referring first to FIGS. 3 and 4 in conjunction with one another, at block 402 of the method 400, messages 302(1)-302(N) can be received by a user device 300 from one or more senders. The user device 300 can be, without limitation, a smartphone, tablet, personal computer, personal digital assistant, content streaming device, or any other suitable computing device. The messages 302(1)-302(N) (collectively referred to hereinafter as incoming messages 302 or simply messages 302) can include, without limitation, mobile application notifications; other web-based notifications; instant messages, SMS messages, emails, or other text-based messages from senders; voicemails or other notifications relating to voice calls; calendar invites or other calendar-based notifications; or the like.

At block 404 of the method 400, computer-executable instructions of one or more message categorization modules 304 can be executed to obtain categorized messages 308 by categorizing the messages 302 into one or more message categories based on message categorization criteria 306. The message categorization criteria 306 can include, without limitation, user-specified criteria and/or default criteria selected by the user device 300 and can include or relate to, without limitation, the sender of a message; the time of receipt of the message; the location of the user device when the message is received; whether one or more keywords are present in the message; and so forth. In certain example embodiments, message categorization may or may not be performed.

In certain example embodiments, the message categorization criteria 306 can relate to priorities associated with the senders of the messages 302. For example, messages received from senders designated by a user as "high priority" can be categorized into a separate message category from messages received from senders designated as "low priority." It should be appreciated that any number of tiers/levels of priority can be specified for senders. In certain example embodiments, the user device 300 or a remote server (e.g., a remote server 604 depicted in FIG. 6) can automatically assign priorities to senders based on historical messaging behavior of the senders. For example, senders who have demonstrated a historical likelihood to send more than a threshold number of messages within a given period of time can be assigned a lower priority than senders who send messages more infrequently, or vice versa. Further, a historical individual or aggregate importance/urgency of the messages can be evaluated and used to automatically assign priority levels to senders. For example, senders who tend to send more important or urgent messages (which can be determined based on the presence or absence of predetermined keywords in the message content) can be assigned a higher priority level. In certain example embodiments, an indication of the priority level assigned to a sender either by a user or automatically by the user device 300 (or a remote server) can be presented in association with identifying information of the sender on a display of the user device 300. For example, an emoticon or other image indicative of a priority associated with a sender can be displayed along with the sender's profile on the device 300.

In other example embodiments, the messages 302 can be categorized based on message categorization criteria 306 relating to time of receipt of the messages 302, location of the user device 300 when the messages are received 302, or the like. For example, in certain example embodiments, the messages 302 can be categorized based on time of receipt by grouping messages received in different predetermined time ranges into different message categories. For instance, messages received in the morning (e.g., 8 A.M. to 12 P.M.) can be categorized into a different message category from messages received in the afternoon (e.g., 12 P.M. 5 P.M.), which in turn, can be categorized into a different message category from messages received in the evening (e.g., 5 P.M. to 12 A.M.). It should be appreciated that the above example time ranges are merely illustrative and not exhaustive and that the time ranges can be specified with any level of granularity. For example, messages received in the early morning (e.g., 12 A.M. to 8 A.M.) can be categorized differently from messages received later in the morning (e.g., 8 A.M. to 12 P.M.).

As mentioned above, in certain example embodiments, the messages 302 can be categorized based on location data. For instance, messages received while the user device 300 is located at or within a predetermined radius from a particular location (e.g., a "home" location) can be categorized into a different message category from messages received while the user device 300 is located at or within a predetermined radius from another location (e.g., a "work" location). A user 318 of the user device 300 can, for example, specify any number of locations that can serve as the basis for message categorization. Alternatively, the user device 300 or a remote server can automatically designate a location as a basis for message categorization if, for example, the location has been visited a threshold number of times by the user device 300 within a given period of time.

In certain example embodiments, device usage data relating to the user device 300 can be used to categorize the messages 302. For example, messages that are received while the user 318 is actively interacting with the user device 300 can be categorized separately from messages that received while the device 300 is idle. As another non-limiting example, data captured by an accelerometer, gyroscope, or the like of the user device 300 can be used to categorize the messages 302. For example, messages received while the user device 300 is moving at a velocity above a threshold value (as determined from accelerometer data for example) can be categorized separately from messages that are received while the user device 300 is stationary.

Referring again to FIG. 4 in conjunction with FIG. 1, at block 406 of the method 400, computer-executable instructions of one or more message delivery determination modules 310 can be executed to identify contextual data 312. The contextual data 312 can include, without limitation, location data, time data, device usage data, or the like. For example, the contextual data 312 can include timestamps indicating times of receipt of the messages 302; device location data indicative of locations of the user device 300 when the messages 302 are received; device usage data such as accelerometer data, device activity data (e.g., whether the device 300 is being actively used by the user 318 or is idle), received message counts, or the like; and so forth. A determination as to whether the user device 300 is being actively used by the user 318 can be based on a number of factors including, without limitation, a number or frequency of touch events or other user interactions with the device 300 within a given time period; an amount of time that has passed since the most recent user interaction with the device 300; or the like.

At block 408 of the method 400, computer-executable instructions of the message delivery determination module(s) 310 can be executed to identify message delivery criteria 314 that are relevant to the categorized messages 308. While example embodiments can be described herein in connection with evaluation of the message delivery criteria 314 with respect to the categorized messages 308 (or more specifically with respect to messages within a given message category), it should be appreciated that the message delivery criteria 314 can additionally, or alternatively, be evaluated with respect to individual messages or with respect to a group of messages spanning multiple message categories.

The message delivery criteria 314 can include or relate to, without limitation, a threshold number of messages being received within a predetermined period of time; a threshold amount of time having passed since receipt of a message from a particular sender; a threshold level of importance/urgency of a message or an aggregate level of importance/urgency of all or some messages within a message category or across multiple message categories; characteristics of a sender of a message; location criteria; time criteria; and so forth.

At block 410 of the method 400, computer-executable instructions of the message delivery determination module(s) 310 can be executed to determine whether the message delivery criteria 314 and the contextual data 312 indicate that one or more of the messages 302 (or one or more of the categorized messages 308 if message categorization has been performed) should be delivered to the user 318. Delivery of a message or group of messages can be delayed until the message delivery criteria 314 is deemed to have been met. As previously noted, delivery of a message to the user 318 can include generating audible, visual, and/or haptic output at the user device 300 that serves as a notification that a message has been received, and optionally, an identification of the urgency of the message, the type of message, and/or the sender of the message. For example, notification of a message received from a "high priority" sender can involve more pronounced or otherwise different audible, visual, and/or haptic output than notification of a message received from a lower priority sender. In certain example embodiments, different types or degrees of output can be associated with notifications of messages received from senders associated with different priority tiers/levels. Further, in certain example embodiments, the nature of the notification output that is generated can depend on the perceived importance/urgency of the message or the group of messages. For example, a message or a group of messages associated with a higher importance/urgency metric can result in a more pronounced audible, visual, or haptic notification output.

More specifically, at block 410 of the method 400, the contextual data 312 can be analyzed to determine whether an individual message 302, a group of categorized messages 308 categorized in a same message category, a group of categorized messages categorized across multiple message categories, and/or a group of uncategorized messages 302 satisfies the message delivery criteria 314. As an example, for certain senders who exhibit a tendency to send numerous messages—potentially of low importance/urgency—within a short period of time, the message delivery criteria 314 can specify that the user 318 is to be notified of receipt of the messages from such a sender only after a threshold number of messages have been received from the sender within a predetermined period of time. As another non-limiting example, the message delivery criteria 314 can specify that the user 318 is to be notified of receipt of the messages from such a sender only after a threshold amount of time has passed since receipt of a most recent message from the sender. As yet another non-limiting example, the message delivery criteria 314 can specify that the user 318 is to be notified of receipt of the messages from such a sender only after a threshold amount of time has passed since receipt of an initial message in a message thread in which each message in the message thread is received within a threshold amount of time from each other message in the thread. As yet another non-limiting example, the message delivery criteria 314 can specify that the user 318 is to be notified of receipt of a particular message or a group of messages from such a sender only after the particular message has reached a threshold level of individual importance/urgency and/or after the group of messages has reached a threshold level of importance/urgency in the aggregate.

In other example embodiments, the message delivery criteria 314 can specify that notification of receipt of messages from a particular sender or from a group of senders should be delayed if received outside of a predetermined period of time during a day or on a particular day and should only be delivered to the user 318 during the predetermined period of time during the day or on designated days. As yet another non-limiting example, the message delivery criteria 314 can specify that delivery of messages from a particular sender or from a group of senders should be delayed until the user device 300 is within a prescribed location or a predetermined radius around the prescribed location or outside of a proscribed location or outside of a predetermined radius around the proscribed location. As still another non-limiting example, the message delivery criteria 314 can specify that delivery of messages from a particular sender or from a group of senders should be delayed until accelerometer data from the user device 300 indicates that the user device 300 is no longer moving or is moving at a velocity that is less than a threshold level.

In certain example embodiments, the message delivery criteria 314 can require an evaluation of various message characteristics in order to determine whether to delay delivery of a message. For example, the content of a message can be analyzed to determine whether one or more predetermined keywords indicative of importance or urgency are present in the message content. The keywords can include words or phrases that indicate importance or urgency such as, for example, "urgent," "important," "must," or the like. In certain example embodiments, if one or more such predetermined keywords are located in the content of a message, the user 318 can be notified of the message without delay. In other example embodiments, the presence or absence of such keywords and/or the number of such keywords present or absent from the message content can constitute a weighted factor used to determine an importance/urgency metric for the message. In such example embodiments, an aggregate importance/urgency metric can be determined for a group of messages (e.g., all or some messages within a same message category, a group of messages received from a same sender, etc.) based on these individual message metrics, and delivery of the group of messages can be delayed until the aggregate metric satisfies a corresponding threshold value.

In other example embodiments, other characteristics of a message can be evaluated against the message delivery criteria 314 to determine whether to delay message delivery. For example, a number or identity of recipients of the message other than the user 318 can be evaluated. Example message delivery criteria 314 can specify that messages that include at least a threshold number of other recipients or at least a threshold number of "high-priority" recipients should be not be delayed. As another non-limiting example, if the message is a meeting/calendar invite or a reminder of an existing meeting/calendar item, the location of the meeting (e.g., whether it is in-person or remote) can impact whether notification of the message is delayed. For instance, a notification of a remote meeting can be delayed until other message delivery criteria 314 are satisfied, whereas a notification of an in-person meeting may or may not be delayed.

In certain example embodiments, applicability of message delivery criteria 314 and associated threshold values to particular senders or message categories and/or the message delivery criteria 314 or threshold values themselves can change based on changes in messaging behavior of senders, changes in the interaction behavior of the user 318 with respect to the user device 300, changes in the contextual data 312, or the like. For example, the priority tier/level associated with a sender who did not previously exhibit disruptive messaging behavior but begins to exhibit such behavior can be lowered and/or messages received from such a sender can begin to be categorized in the same message category as messages received from similarly disruptive senders, thereby causing message delivery criteria 314 to be applied to the sender that was not previously applied to the sender. As another non-limiting example, a sender can begin to exhibit less disruptive messaging behavior (e.g., reduced frequency of messages received from the sender over an evaluation time period), in which case, message delivery criteria 314 applied to messages from the sender can be altered to reflect this changed behavior of the sender. For example, the threshold number of messages or threshold amount of elapsed time since the most recent message from the sender needed to satisfy the message delivery criteria 314 can be reduced for the sender.

In addition, in certain example embodiments, the user device 300 or a remote server can automatically alter existing message delivery criteria 314 or create new message delivery criteria independently of preferences specified by the user 318. For example, the user device 300 or a remote server can analyze the messaging behavior of a sender to determine whether more or less stringent message delivery criteria 314 should be applied to messages from the sender. More specifically, the user device 300 or a remote server can analyze the number of messages received from the sender over a given period of time, the average amount of time that elapses between consecutive messages, the frequency of high-value messages from the sender (e.g., messages having content characteristics indicative of high importance or urgency), or the like to determine the messaging behavior of the sender. If a sender's messaging behavior is determined to have become more disruptive, more stringent message delivery criteria 314 can be used to evaluate messages from the sender (e.g., the thresholds applied can be increased). Conversely, if a sender's messaging behavior is determined to have become less disruptive, less string message delivery criteria 314 can be used.

As another non-limiting example, if a threshold number of messages have been received from a sender within a given period of time without any intermediate response from the user 318, the user device 300 or a remote server can generate new message delivery criteria 314 that reduces the number of notifications relating to the messages that are generated or that reduces the number of messages themselves by eliminating redundant messages or messages deemed to have relatively low importance. As yet another non-limiting example, changes in the device usage behavior of the user 318 can result in modifications to the applicability or nature of the message delivery criteria 314 that is used to evaluate whether message notification should be delayed. For example, if a user begins using the user device 300 more actively (e.g., more user interactions with the user device 300 within a given period of time), the user device 300 or a remote server can loosen the message delivery criteria 314 that is applied to a subset of senders or messages, or potentially, to all senders and all messages.

In still other example embodiments, no message delivery criteria 314 can be specified for a particular message; a particular group of messages; a particular sender; a particular group of senders; or a particular contextual scenario (e.g., a particular time range during a day). In such example scenarios, default message delivery criteria can be applied. For example, default message delivery criteria can specify that a message is to be immediately delivered as long as it is received outside of a proscribed time of day and/or when the user device 300 is outside of a proscribed geographic region.

Applicability of any of the example message delivery criteria 314 or corresponding threshold values described herein can vary based on the particular sender or message category against which the criteria 314 is evaluated. For instance, messages received outside of a particular time range or outside of a particular location or geographic region can be delayed for certain senders and/or for certain message categories. More particularly, messages received from low priority senders or senders determined to exhibit disruptive messaging behavior (e.g., frequent low value messages within a given period of time) can be subject to delay based on the example messaging criteria 314 described above. As previously described, if message categorization is performed, the messages 302 can be categorized based on shared attributes of the senders, and thus, only certain message categories (e.g., a message category that includes messages from senders that exhibit disruptive message behavior) can be subject to notification delay while other message categories are not.

While example message delivery criteria 314 can be described herein as being applicable to a particular sender, it should be appreciated that the same message delivery criteria 314 can be used to evaluate a group of messages (e.g., messages within a same message category or messages categorized across multiple different message categories), which can be received from multiple different senders. For example, the same message delivery criteria 314 can be used to evaluate all or some messages 308 categorized within a same message category even if the messages are received from different senders. As described earlier, shared characteristics or attributes of senders can form at least a partial basis for message categorization. For instance, all messages received from senders designated at the same priority tier/level can be categorized in the same message category. As another non-limiting example, all messages received from senders designated by a user as being frequent disruptive senders or determined automatically to be frequent disruptive senders based on historical messaging behavior (e.g., at least a threshold number of historical messages received from the sender within a given period of time) can be grouped into a same message category. Accordingly, evaluation of the message delivery criteria 314 with respect to categorized messages 308 within a same message category can, depending on the message categorization criteria 306 that is used, reflect application of the same message delivery criteria 314 to senders who exhibit the same messaging behavior.

Referring again to FIGS. 3 and 4 in conjunction with one another, in response to a positive determination at block 410, the method 400 can proceed to block 412, where computer-executable instructions of one or more message notification modules 320 can be executed to generate one or more notifications 316 indicative of receipt of the one or more messages that are determined to have satisfied applicable message delivery criteria 314. As previously described, the notification(s) 316 can include visual, audible, and/or haptic output at the user device 300. At block 414 of the method 400, the notification(s) 316 can be presented to the user 318 via the user device 300. From block 414, the method 400 can continue iteratively from block 402. Further, in response to a negative determination at block 410, the method 400 can again proceed from block 402.

Referring now to FIG. 3 in conjunction with FIG. 5, at block 502 of the method 500, computer-executable instructions of the message categorization module(s) 304 can be executed to categorize at least a portion of the messages 302 into a particular message category based on the message categorization criteria 306, as described earlier. At block 504 of the method 500, computer-executable instructions of the message delivery determination module(s) 310 can be executed to determine a respective metric for each message within the message category based on applicable message delivery criteria 314.

Each respective metric can be an importance score or the like that represents a measure of a level of importance or urgency of the corresponding message. The metric can be determined based on any number of relevant factors including, without limitation, whether predetermined keywords indicative of importance or urgency are present in the message; a priority assigned to a sender of the message; a time of day during which the message is received; a frequency with which messages are historically received from the sender; and so forth. The various factors that are evaluated can be assigned respective weights, which can be predetermined or can dynamically change based on message delivery criteria 314 and/or changes in the contextual data 312.

At block 506 of the method 500, computer-executable instructions of the message delivery determination module(s) 310 can be executed to determine an aggregate importance/urgency metric for a group of messages (e.g., all or some of the messages in the message category) based on the respective metric of each individual message in the group of messages. The group of messages can be from a same sender or from a group of senders who share common attributes. Alternatively, the group of messages can simply be some or all messages categorized within in the same message category based on message content or other criteria unrelated to the senders of the messages.

At block 508 of the method, computer-executable instructions of the message delivery determination module(s) 310 can be executed to compare the aggregate metric against a threshold value to determine whether the aggregate metric satisfies the threshold value. Additionally, or alternatively, one of more of the importance/urgency metrics associated with individual messages can be compared against corresponding threshold values. The threshold value forming the basis for comparison at block 508 can be user-specified or a default value.

In response to a positive determination at block 508, the method 500 can proceed to block 510, where computer-executable instructions of the message notification module(s) 320 can be executed to generate and present to the user 318 notification(s) 316 indicative of receipt of messages whose corresponding aggregate importance/urgency metric was determined to satisfy a corresponding threshold value at block 508. The method 500 can then proceed iteratively from block 502. In response to negative determination at block 508, the method 500 can also proceed iteratively from block 502.

Example embodiments of the disclosure provide various technical features, technical effects, and/or improvements to technology. For instance, example embodiments of the disclosure provide the technical effect of delaying notification to a user of messages received at or generated by a user device until corresponding message delivery criteria are satisfied. This technical effect is achieved at least in part by the technical features of categorizing incoming messages based on message categorization criteria and evaluating message delivery criteria and contextual data against particular senders, particular messages, and/or particular message categories to determine whether message notification should be delayed.

The above-mentioned technical effects and technical features yield an improvement to computer technology. In particular, the technical aspects of this disclosure yield an improvement to mobile device messaging technology by allowing a user to specify criteria that is used to determine whether to delay delivery of a message or a group of messages and customize and tailor the criteria in relation to sender characteristics, message characteristics, or other contextual characteristics. In addition, example embodiments of the disclosure provide an additional improvement to mobile device messaging technology by providing the capability to automatically alter existing message delivery criteria or create new message delivery criteria independently of user-specified preferences. In this manner, a software-based technological improvement to message delivery by a user device is achieved that enhances the user experience with the user device. It should be appreciated that the above examples of technical features, technical effects, and improvements to the functioning of a computer and computer technology provided by example embodiments of the disclosure are merely illustrative and not exhaustive.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 6:
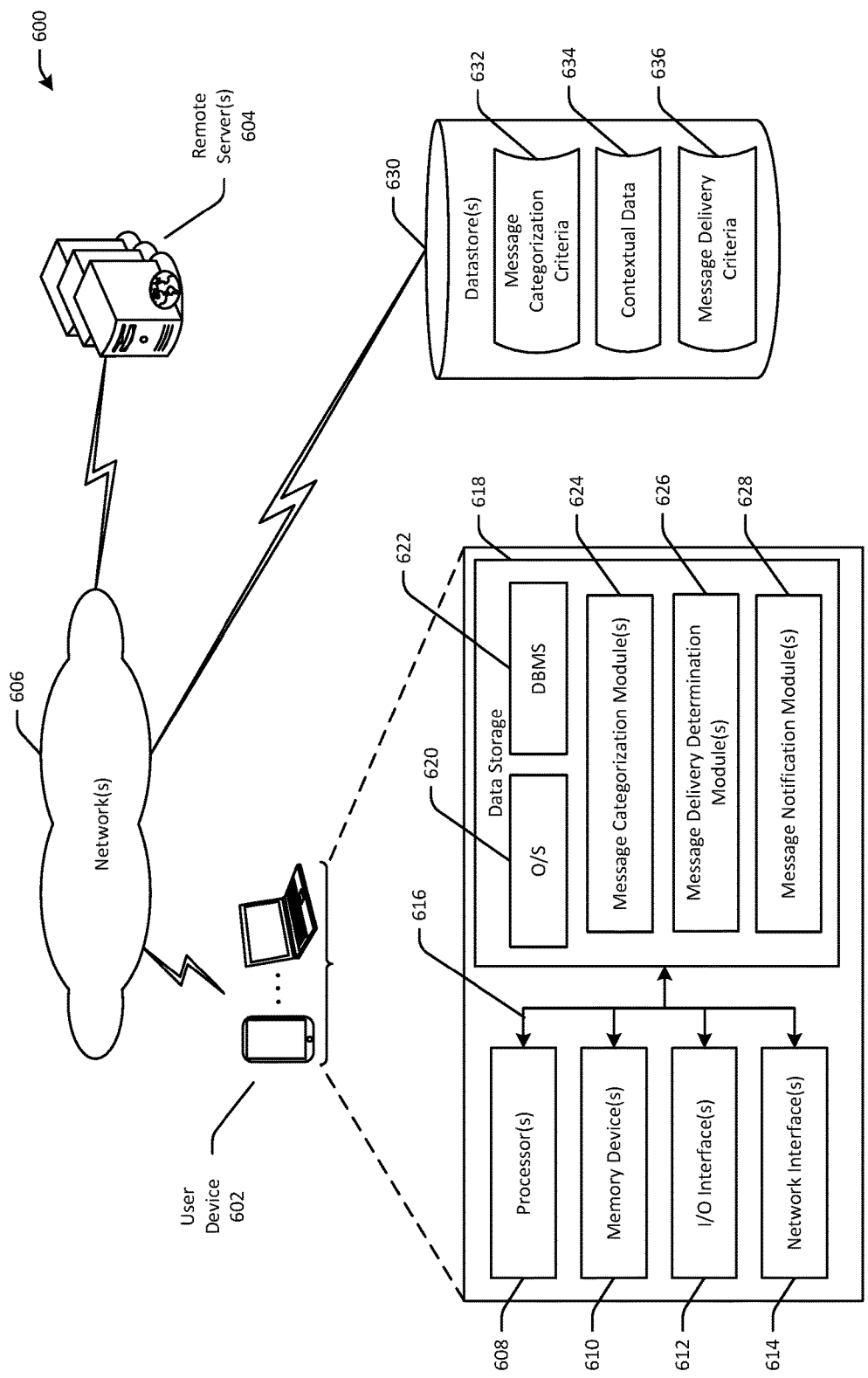
FIG. 6 is a schematic diagram of an illustrative networked architecture configured to implement one or more example embodiments of the disclosure.

FIG. 6 is a schematic diagram of an illustrative networked architecture 600 configured to implement one or more example embodiments of the disclosure. The networked architecture 600 can include one or more user devices 602 and one or more remote servers 604 communicatively coupled via one or more networks 606. While the user device(s) 602 and/or the remote server(s) 604 can be described herein in the singular, it should be appreciated that multiple instances of such devices can be provided and functionality described in connection with the user device 602 and/or the remote server 604 can be distributed across such multiple instances. The user device 602 can represent an example configuration of the user device 300 and can be configured to implement any of the functionality described earlier in connection with the user device 300. Further, the remote server 604 can include hardware, firmware, and/or software components similar to those depicted in the illustrative configuration of the user device 602 shown in FIG. 6 and can implement any of the functionality described earlier in connection with the user device 300. In certain example embodiments, functionality described herein can be distributed among the user device 602 and the remote server 604.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the user device 602 can include one or more processors (processor(s)) 608, one or more memory devices 610 (generically referred to herein as memory 610), one or more input/output ("I/O") interface(s) 612, one or more network interfaces 614, and data storage 618. The device 602 can further include one or more buses 616 that functionally couple various components of the device 602.

The bus(es) 616 can include at least one of a system bus, a memory bus, an address bus, or a message bus, and can permit the exchange of information (e.g., data (including computer-executable code), signaling, etc.) between various components of the device 400. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein.

The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620; one or more database management systems (DBMS) 622 configured to access the memory 610 and/or one or more external data store(s) 630 (potentially via a network 606); and one or more program modules, applications, engines, computer-executable code, scripts, or the like such as, for example, one or more message categorization modules 624, one or more message delivery determination modules 626, and one or more message notification modules 628. Any of these modules can, in turn, include various sub-modules. Any of the components depicted as being stored in data storage 618 can include any combination of software, firmware, and/or hardware. The software and/or firmware can include computer-executable instructions (e.g., computer-executable program code) that can be loaded into the memory 610 for execution by one or more of the processor(s) 608 to perform any of the operations described earlier in connection with correspondingly named modules.

Although not depicted in FIG. 6, the data storage 618 can further store various types of data utilized by components of the device 602 (e.g., any of the data shown as being stored in the data store(s) 630). Any data stored in the data storage 618 can be loaded into the memory 610 for use by the processor(s) 608 in executing computer-executable instructions. In addition, any data stored in the data storage 618 can potentially be stored in the data store(s) 630 and can be accessed via the DBMS 622 and loaded in the memory 610 for use by the processor(s) 608 in executing computer-executable instructions.

The processor(s) 608 can be configured to access the memory 610 and execute computer-executable instructions loaded therein. For example, the processor(s) 608 can be configured to execute computer-executable instructions of the various program modules, applications, engines, or the like of the device 602 to cause or facilitate various operations to be performed in accordance with one or more embodiments of the disclosure. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the device 602 and hardware resources of the device 602. More specifically, the O/S 620 can include a set of computer-executable instructions for managing hardware resources of the device 602 and for providing common services to other application programs. In certain example embodiments, the O/S 620 can include or otherwise control execution of one or more of the program modules depicted as being stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in the external data store(s) 630. The DBMS 622 can use any of a variety of database models (e.g., relational model, object model, etc.) and can support any of a variety of query languages. The DBMS 622 can access data represented in one or more data schemas and stored in any suitable data repository. The data store(s) 630 can store data 632 indicative of any of the types of message categorization criteria 306 previously described, contextual data 634 (which can include any of the types of contextual data 312 previously described), and data 636 indicative of any of the types of message delivery criteria 314 previously described. The data store(s) 630, which can be accessible by the device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the device 602, the input/output (I/O) interface(s) 612 can facilitate the receipt of input information by the device 602 from one or more I/O devices as well as the output of information from the device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the device 602 or can be separate. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 602 can further include one or more network interfaces 614 via which the device 602 can communicate with any of a variety of other systems, platforms, networks, devices, and so forth. The network interface(s) 614 can enable communication, for example, with one or more other devices via one or more of the network(s) 606.

It should be appreciated that the program modules depicted in FIG. 6 as being stored in the data storage 618 are merely illustrative and not exhaustive and that processing described as being supported by any particular module can alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the device 602 and/or hosted on other computing device(s) (e.g., the remote server 604) accessible via one or more of the network(s) 606, can be provided to support functionality provided by the modules depicted in FIG. 6 and/or additional or alternate functionality. Further, functionality can be modularized in any suitable manner such that processing described as being performed by a particular module can be performed by a collection of any number of program modules, or functionality described as being supported by any particular module can be supported, at least in part, by another module. In addition, program modules that support the functionality described herein can be executable across any number of devices 602 and/or servers 604 in accordance with any suitable computing model such as, for example, a client-server model, a peer-to-peer model, and so forth. In addition, any of the functionality described as being supported by any of the modules depicted in FIG. 6 can be implemented, at least partially, in hardware and/or firmware across any number of devices or servers.

It should further be appreciated that the device 602 can include alternate and/or additional hardware, software, or firmware components beyond those described or depicted without departing from the scope of the disclosure. More particularly, it should be appreciated that software, firmware, or hardware components depicted as forming part of the device 602 are merely illustrative and that some components may or may not be present or additional components can be provided in various embodiments. While various illustrative modules have been depicted and described as software modules stored in data storage 618, it should be appreciated that functionality described as being supported by the modules can be enabled by any combination of hardware, software, and/or firmware. It should further be appreciated that each of the above-mentioned modules can, in various embodiments, represent a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular module can, in various embodiments, be provided at least in part by one or more other modules. Further, one or more depicted modules may or may not be present in certain embodiments, while in other embodiments, additional program modules and/or engines not depicted can be present and can support at least a portion of the described functionality and/or additional functionality.

One or more operations of the method 400 and/or the method 500 can be performed by a device 602 having the illustrative configuration depicted in FIG. 6, or more specifically, by one or more program modules, engines, applications, or the like executable on such a device. It should be appreciated, however, that such operations can be implemented in connection with numerous other device configurations. In addition, any of the functionality described in connection with the device 602 (or the user device 300) can be provided, at least in part, by one or more of the remote servers 604.

The operations described and depicted in the illustrative method 400 of FIG. 4 and/or the illustrative method 500 of FIG. 5 can be carried out or performed in any suitable order as desired in various example embodiments of the disclosure. Additionally, in certain example embodiments, at least a portion of the operations can be carried out in parallel. Furthermore, in certain example embodiments, less, more, or different operations than those depicted in FIG. 4 and/or FIG. 5 can be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component can be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for delaying message notification, the method comprising:
   receiving, by a user device, messages from one or more senders;
   categorizing the messages into one or more message categories based at least in part on message categorization criteria, wherein categorizing the messages comprises categorizing a first group of the messages into a first category associated with a first priority level and a second group of the messages into a second category associated with a second priority level, wherein the first priority level is higher than the second priority level, and wherein categorizing the second group of the messages into the second category comprises:
      determining that the second group of the messages was received from a particular sender; and
      determining that one or more predetermined keywords indicative of an urgency of a message are absent from a threshold number of historical messages received from the particular sender;
   identifying contextual data, wherein the contextual data comprises a message count for the second group of the messages received from the particular sender;
   identifying message delivery criteria that is relevant to the categorized messages;
   determining that notification to a user of the user device of receipt of the second group of the messages is to be delayed based at least in part on the second priority level associated with the second category into which the second group of the messages are categorized and the message delivery criteria;
   determining, based at least in part on the contextual data, that at least one message of the second group of the messages from the particular sender satisfies the message delivery criteria for delivery to the user, wherein determining that the at least one message satisfies the message delivery criteria comprises determining, based at least in part on the message count, that more than a threshold number of messages have been received from the particular sender within a predetermined period of time;
   generating one or more notifications indicative of receipt of the at least one message responsive at least in part to determining that more than the threshold number of messages have been received from the particular sender within the predetermined period of time; and
   presenting, via the user device, the one or more notifications to the user of the user device.

2. The computer-implemented method of claim 1, wherein the particular sender is a first sender and the threshold number of historical messages is a first threshold number of historical messages, and wherein categorizing the first group of the messages into the first category comprises:
   determining that the first group of the messages was received from a second sender; and
   determining that at least one of the one or more predetermined keywords indicative of an urgency of a message are present in a second threshold number of historical messages received from the second sender.

3. The computer-implemented method of claim 1, wherein determining that the notification to the user of the user device of receipt of the second group of the messages is to be delayed comprises determining a user preference that indicates that notification of messages received from the particular sender are to be delayed in the absence of satisfaction of the message delivery criteria.

4. The computer-implemented method of claim 1, wherein the at least one message is a first message, the method further comprising determining that a second message in the second group of the messages satisfies the message delivery criteria at least in part by:
   determining, from the contextual data, a timestamp associated with receipt of the second message; and
   determining, based at least in part on the timestamp, that the second message was received by the user device within a time period during which notification of messages received from the particular sender are permitted.

5. The computer-implemented method of claim 1, wherein the at least one message is a first message, the method further comprising determining that a second message in the second group of the messages satisfies the message delivery criteria at least in part by:
   determining, from the contextual data, a current location of the user device; and
   determining that notification of messages received from the particular sender are permitted while the user device is at the current location.

6. The computer-implemented method of claim 1, wherein the at least one message is a first message, the method further comprising determining that a second message in the second group of the messages satisfies the message delivery criteria at least in part by determining that the second message includes at least one of the one or more predetermined keywords indicative of an urgency of a message.

7. The computer-implemented method of claim 1, further comprising determining that the first group of the messages satisfies the message delivery criteria at least in part by:
   determining a respective metric for each message in the first group of the messages, wherein each respective metric represents a measure of importance of a corresponding message in the first group of the messages;
   determining an aggregate metric based at least in part on each respective metric, wherein the aggregate metric represents an aggregate measure of importance of all messages in the first group of the messages;
   determining that the aggregate metric satisfies a threshold value; and
   determining that each message in the first group of the messages satisfies the message delivery criteria based at least in part on determining that the aggregate metric satisfies the threshold value.

8. A system for delaying message notification, the system comprising:
   at least one memory storing computer-executable instructions; and
   at least one processor configured to access the at least one memory and execute the computer-executable instructions to:
      identify messages received by a user device from one or more senders;
      categorize the messages into one or more message categories based at least in part on message categorization criteria, wherein the at least one processor is configured to categorize the messages by executing the computer-executable instructions to:
         categorize a first group of the messages into a first category associated with a first priority level and categorize a second group of the messages into a second category associated with a second priority level, wherein the first priority level is higher than the second priority level, and wherein the at least one processor is configured to categorize the second group of the messages into the second category by executing the computer-executable instructions to:
  determine that the second group of the messages was received from a particular sender; and
  determine that one or more predetermined keywords indicative of an urgency of a message are absent from a threshold number of historical messages received from the particular sender;
identify contextual data, wherein the contextual data comprises a message count for the second group of the messages received from the particular sender;
identify message delivery criteria that is relevant to the categorized messages;
determine that notification to a user of the user device of receipt of the second group of the messages is to be delayed based at least in part on the second priority level associated with the second category into which the second group of the messages are categorized and the message delivery criteria;
determine, based at least in part on the contextual data, that at least one message of the second group of the messages from the particular sender satisfies the message delivery criteria for delivery to the user, wherein the at least one processor is configured to determine that the at least one message satisfies the message delivery criteria by executing the computer-executable instructions to determine, based at least in part on the message count, that more than a threshold number of messages have been received from the particular sender within a predetermined period of time;
generate one or more notifications indicative of receipt of the at least one message responsive at least in part to determining that more than the threshold number of messages have been received from the particular sender within the predetermined period of time; and
present, via the user device, the one or more notifications to the user.

9. The system of claim 8, wherein the particular sender is a first sender and the threshold number of historical messages is a first threshold number of historical messages, and wherein the at least one processor is configured to categorize the first group of the messages into the first category by executing the computer-executable instructions to:
  determine that the first group of the messages was received from a second sender; and
  determine that at least one of the one or more predetermined keywords indicative of an urgency of a message are present in a second threshold number of historical messages received from the second sender.

10. The system of claim 8, wherein the at least one processor is configured to determine that the notification to the user of the user device of receipt of the second group of the messages is to be delayed by executing the computer-executable instructions to determine a user preference that indicates that notification of messages received from the particular sender are to be delayed in the absence of satisfaction of the message delivery criteria.

11. The system of claim 8, wherein the at least one message is a first message, and wherein the at least one processor is further configured to execute the computer-executable instructions to determine that a second message in the second group of the messages satisfies the message delivery criteria at least in part by:
  determining, from the contextual data, a timestamp associated with receipt of the second message; and
  determining, based at least in part on the timestamp, that the second message was received by the user device within a time period during which notification of messages received from the particular sender are permitted.

12. The system of claim 8, wherein the at least one message is a first message, and wherein the at least one processor is further configured to execute the computer-executable instructions to determine that a second message in the second group of the messages satisfies the message delivery criteria at least in part by:
  determining, from the contextual data, a current location of the user device; and
  determining that notification of messages received from the particular sender are permitted while the user device is at the current location.

13. The system of claim 8, wherein the at least one message is a first message, and wherein the at least one processor is further configured to execute the computer-executable instructions to determine that a second message of the second group of the messages satisfies the message delivery criteria at least in part by determining that the second message includes at least one of the one or more predetermined keywords indicative of an urgency of a message.

14. The system of claim 8, wherein the at least one processor is further configured to determine that the first group of the messages satisfies the message delivery criteria at least in part by:
  determining a respective metric for each message in the first group of the messages, wherein each respective metric represents a measure of importance of a corresponding message in the first group of the messages;
  determining an aggregate metric based at least in part on each respective metric, wherein the aggregate metric represents an aggregate measure of importance of all messages in the first group of the messages;
  determining that the aggregate metric satisfies a threshold value; and
  determining that each message in the first group of the messages satisfies the message delivery criteria based at least in part on the determination that the aggregate metric satisfies the threshold value.

15. A computer program product for delaying message notification, the computer program product comprising a storage medium readable by a processing circuit, the storage medium storing instructions executable by the processing circuit to cause a method to be performed, the method comprising:
  receiving, by a user device, messages from one or more senders;
  categorizing the messages into one or more message categories based at least in part on message categorization criteria, wherein categorizing the messages comprises categorizing a first group of the messages into a first category associated with a first priority level and a second group of the messages into a second category associated with a second priority level, wherein the first priority level is higher than the second priority level, and wherein categorizing the second group of the messages into the second category comprises:
    determining the second group of the messages was received from a particular sender; and
    determining that one or more predetermined keywords indicative of an urgency of a message are absent from a threshold number of historical messages received from the particular sender;

identifying contextual data, wherein the contextual data comprises a message count for the second group of the messages received from the particular sender;

identifying message delivery criteria that is relevant to the categorized messages;

determining that notification to a user of the user device of receipt of the second group of the messages is to be delayed based at least in part on the second priority level associated with the second category into which the second group of the messages are categorized and the message delivery criteria;

determining, based at least in part on the contextual data, that at least one message of the second group of the messages from the particular sender satisfies the message delivery criteria for delivery to the user, wherein determining that the at least one message satisfies the message delivery criteria comprises determining, based at least in part on the message count, that more than a threshold number of messages have been received from the particular sender within a predetermined period of time;

generating one or more notifications indicative of receipt of the at least one message responsive at least in part to determining that more than the threshold number of messages have been received from the particular sender within the predetermined period of time; and presenting, via the user device, the one or more notifications to the user.

16. The computer program product of claim 15, wherein the particular sender is a first sender and the threshold number of historical messages is a first threshold number of historical messages, and wherein categorizing the messages into the first group of the messages comprises:

determining that the first group of the messages were received from a second sender; and determining that at least one of the one or more predetermined keywords indicative of an urgency of a message are present in a second threshold number of historical messages received from the second sender.

17. The computer program product of claim 15, wherein determining that the notification to the user of the user device of receipt of the second group of the messages is to be delayed comprises determining a user preference that indicates that notification of messages received from the particular sender are to be delayed in the absence of satisfaction of the message delivery criteria.

18. The computer program product of claim 15, wherein the at least one message is a first message, the method further comprising determining that a second message in the second group of the messages satisfies the message delivery criteria at least in part by:

determining, from the contextual data, a timestamp associated with receipt of the second message;

determining, from the contextual data, a current location of the user device; and determining, based at least in part on the timestamp, that the second message was received by the user device within a time period during which notification of messages received from the particular sender are permitted or determining that notification of messages received from the particular sender are permitted while the user device is at the current location.

19. The computer program product of claim 15, wherein the at least one message is a first message, the method further comprising determining that a second message of the second group of the messages satisfies the message delivery criteria at least in part by determining that the second message includes at least one of the one or more predetermined keywords indicative of an urgency of a message.

20. The computer program product of claim 15, further comprising determining that the first group of the messages satisfies the message delivery criteria at least in part by:

determining a respective metric for each message in the first group of the messages, wherein each respective metric represents a measure of importance of a corresponding message in the first group of the messages;

determining an aggregate metric based at least in part on each respective metric, wherein the aggregate metric represents an aggregate measure of importance of all messages in the first group of the messages;

determining that the aggregate metric satisfies a threshold value; and determining that each message in the first group of the messages satisfies the message delivery criteria based at least in part on determining that the aggregate metric satisfies the threshold value.

* * * * *